United States Patent [19]

Das et al.

[11] Patent Number: 4,745,028

[45] Date of Patent: * May 17, 1988

[54] SIZED GLASS FIBERS AND REINFORCED POLYMERS CONTAINING SAME

[75] Inventors: Balbhadra Das, Pittsburgh; Chester S. Temple, McKees Rocks; Carl A. Melle, Allison Park, all of Pa.

[73] Assignee: PPG Industries, Inc., Pittsburgh, Pa.

[*] Notice: The portion of the term of this patent subsequent to Oct. 7, 2003 has been disclaimed.

[21] Appl. No.: 875,045

[22] Filed: Jun. 17, 1986

Related U.S. Application Data

[62] Division of Ser. No. 717,758, Mar. 29, 1985, Pat. No. 4,637,956.

[51] Int. Cl.$^4$ .................... B32B 9/00; D02G 3/00
[52] U.S. Cl. ..................... 428/391; 65/3.41; 65/3.44; 428/392
[58] Field of Search ............. 428/375, 378, 391, 392; 65/3.41, 3.43, 3.44; 525/113; 523/404, 415; 528/110, 116

[56] References Cited

U.S. PATENT DOCUMENTS

| | | | |
|---|---|---|---|
| 4,148,772 | 4/1979 | Marchetti | 528/110 X |
| 4,185,138 | 1/1980 | Graham | 428/378 X |
| 4,283,322 | 8/1981 | Temple | 428/392 |
| 4,330,444 | 5/1982 | Pollman | 523/404 |
| 4,341,877 | 7/1982 | Das et al. | 428/378 |
| 4,399,242 | 8/1983 | Fowler et al. | 523/404 |
| 4,401,499 | 8/1983 | Kaneko | 427/386 X |
| 4,435,474 | 3/1984 | Das et al. | 428/392 |
| 4,608,304 | 8/1986 | Rosthauser | 428/378 |
| 4,615,946 | 10/1986 | Temple | 428/378 X |

*Primary Examiner*—Lorraine T. Kendell
*Attorney, Agent, or Firm*—Kenneth J. Stachel

[57] ABSTRACT

Strands of chemically treated glass fibers of the present invention result in fiber reinforced polar thermosetting and thermoplastic polymers having good strength properties. The chemically treated glass fibers are treated with the an aqueous chemical treating composition having an epoxy polyurethane copolymer or a polyepoxide resin with blocked polyisocyanate functionality, and at least one or more organo coupling agents. The epoxy polyurethane copolymer or epoxy with polyisocyanate functionality can be chain extended with organic polyols. The blocked polyisocyanates can be either partially or fully blocked. Also the aqueous chemical treating composition can have one or more cationic and/or nonionic fiber lubricants, epoxy polyvinyl acetate copolymer in conjunction with an ethylene vinyl acetate copolymer or an epoxy polymer and mixtures of the fiber lubricant with the polymeric materials.

18 Claims, No Drawings

4,745,028

SIZED GLASS FIBERS AND REINFORCED POLYMERS CONTAINING SAME

This is a division of application Ser. No. 717,758, filed Mar. 29, 1985, now U.S. Pat. No. 4,637,956.

The present invention relates to glass fibers that are treated with an aqueous chemical treating composition during the formation of the fibers to produce a dried residue on the glass fibers. Strands of the glass fibers can be used to reinforce matrix polymers.

Strands of glass fibers in sundry form such as continuous, chopped and chopped or continuous mats have been used in various methods to reinforce polymers to produce fiber reinforced plastics. Just a few methods of reinforcing polymers include preparing sheet molding compound, bulk molding compound, filament winding techniques, injection molding techniques and the like. Glass fibers strands have found wide acceptance in reinforcing polymers due to their exceptional mechanical properties. This acceptance was gained even though the nascent glass fibers have a low resistance to interfilament abrasion and a hydrophilic surface having little or no affinity for polymeric materials. These apparent drawbacks were assuaged by producers and users of glass fibers for reinforcements by applying chemical treating compositions to the glass fibers. For instance, glass fiber manufacturers have applied nonaqueous and aqueous chemical treating compositions during the process of forming glass fibers into chopped or continuous glass fiber strands. These treatments are usually referred to as forming size compositions. Also slashing size compositions and mat sizing compositions and numerous other chemical treatments have been used.

In the past, forming size compositions for glass fibers to be used in reinforcing polymers usually had a coupling agent, a lubricant and possibly one or more film forming polymers. There is a continuing need in the art to improve both the protection of the glass fibers and the bond between the glass fibers and matrix polymers. The protection from abrasion should be adequate for both during the formation of the glass fibers and in the various rigorous processes the fibers undergo in the procution of fiber reinforced plastics. These goals at times appear to be mutually exclusive. The strand of glass fibers is best protected in processing by maintaining integrity of the strands and preventing filamentization, which could cause fuzz balls during processing. However, in order to obtain a reinforced polymer product which has a uniform low ripple and smooth surface, it is best that the strands of glass fibers are broken down into the component filaments in the polymeric matrix. Hence, once the strands of glass fibers are in contact with the matrix polymer, the wettability of the sized glass fibers constituting the strands should enable the strands to filamentize into their component fibers to produce the molded fiber reinforced plastic composites with good strength properties.

It is an object of the present invention to provide chemically treated glass fibers and strands made therefrom having good wettability of the fibers in the polymeric matrix, while also having good toughness which translates into reinforced polymers having one or more improved strength properties of tensile strength, flexural strength and impact strength.

SUMMARY OF THE INVENTION

Accordingly, the broadest scope of the present invention involves glass fibers treated with an aqueous chemical treating composition having: an aqueous soluble, dispersible or emulsifiable polyepoxide having crosslinkable polyisocyanate or polyurethane moieties (adducts), and at least one or more coupling agents. The polyepoxide with the crosslinkable polyisocyanate or polyurethane is essentially saturated and crosslinking can occur through condensation reaction between the polyisocyanate with active hydrogens or hydroxyls and active hydrogens of the polyepoxide portion of the resin. Crosslinking can also occur by activation by free radical mechanisms between the epoxy and urethane polymers through abstractable hydrogens. Also the polyepoxide is essentially free of any quaternary ammonium salts. The polyepoxide polymer or copolymer has blocked, grafted or pendant epoxy functionality and can be the sole polymeric material in the aqueous chemical treating composition. Also the polyepoxide with the polyisocyanate functionality can be chain extended with organic polyols through a polyepoxide amine adduct. In addition, the aqueous treating composition can have one or more cationic or nonionic fiber lubricants.

In another aspect of the present invention, the glass fibers are treated with an aqueous chemical treating composition having: an aqueous dispersion of a polyepoxide resin in combination with blocked, crosslinkable polyisocyanate, one or more organo silane coupling agents, one or more cationic or noninic lubricants and water. Optionally, there can be present an aqueous soluble, dispersible or emulsifiable epoxy polyvinyl acetate copolymer and an aqueous soluble, dispersible or emulsifiable ethylene vinyl acetate copolymer. In the alternative, there optinally can be present a second epxoy polymer. The polyepoxide can be chain extended with organic polyols through a primary or secondary amine. The blocked polyisocyanate can be partially blocked so that the polyepoxide combined with the polyisocyanate is actually a copolymer. Also the polyisocyanate can be fully blocked so that it is present in the dispersion but not reacted to an appreciable extent with the polyepoxide until curing of the aqueous chemical treating composition on the glass fibers as a dried residue. The glass fibers with the dried residue is produced by drying the strands of the treated glass fibers either at ambient temperatures or at elevated temperatures. The amount of the dried residue on the glass fibers is an effective amount to protect the glass fibers during processing and to provide wettability and compatibility of the treated glass fibers with polymeric matrices. The dried, chemically treated, glass fibers can be used to reinforce various polar thermosetting and thermoplastic polymers used in sheet molding compounds, bulk molding compounds and filament winding, injection molding, compression molding and the like processes.

DETAILED DESCRIPTION OF THE INVENTION

The polyepoxide polymer or copolymer with the isocyanate or polyisocyanate functionality can involve epoxy-polyurethane copolymers. These materials can be formed by the use of a polyepoxide prepolymer having one or more oxirane rings to give a 1,2-epoxy functionality and also having open oxirane rings, which are useful as the hydroxyl groups for the dihydroxyl-containing compounds for reaction with diisocyanate or polyisocyanates. The isocyanate moiety opens the oxirane ring and the reaction continues as an isocyanate reaction with a primary or secondary hydroxyl group. There is sufficient epoxide functionality on the polyepoxide resin to enable the production of an epoxy polyurethane copolymer still having effective oxirane rings. Linear polymers are produced through reactions of diepoxides and diisocyanates. The di- or polyisocyanates can be aromatic or aliphatic, although the aliphatic di- or polyisocyanates are preferred for better thermal stability and non-yellowing of the chemically treated glass fibers. The equivalent weight of the epoxy on the polyepoxide resin is effective to provide an epoxy polyurethane copolymer having adequate epoxy functionality to give good wettability for the chemically treated glass fibers in the matrix resin. The aqueous dispersion or emulsion of the epoxy polyurethane copolymer is prepared by reacting the copolymer with a primary or secondary amine to form an epoxide-amine adduct. With the secondary amine, the reaction occurs through the amine opening the epoxide ring forming a tertiary amine and a secondary hydroxyl group. The epoxide amine adduct is solubilized and attains its cationic character by further reaction with an acid to form the tertiary amine acid salt. Optionally, a solvent such as a water-miscible solvent, nonexclusive examples of which are ester, ether or ketone can be employed.

A suitable class of polyepoxide resins having isocyanate or polyisocyanate functionality is a polymeric material containing two or more epoxy groups per molecule, where the polyepoxides are of relatively high molecular weight having molecular weights of at least 350, preferably within the range of 350 to 5,000. These polyepoxides are combined with blocked, crosslinkable isocyanate derivatives. The blocked isocyanate derivatives act as crosslinking or curing agents for the polyepoxide to produce epoxy polyurethane copolymers. The polyepoxide can be an epoxide-amine adduct, for instance, a tertiary amine acid salt-containing resin. This resin has an active hydrogen group, which is reacted with the polyisocyanate, and examples of the active hydrogen include hydroxyl and primary amino hydrogen functionality. The polyisocyanates can be fully blocked or partially blocked so that they will not react with the active hydrogens in the aqueous solution, dispersion or emulsion until the strands of chemically treated glass fibers are heated to a high temperature sufficient to unblock the blocked isocyanate and cure the epoxy polyurethane copolymer.

Types of polyepoxide polymers which can form epoxide amine adducts are given in U.S. Pat. No. 4,148,772 (Marchetti et al.) where the portions of this patent relating to the description of the polyepoxide polymers and epoxide-amine adducts are incorporated herein by reference. Also the polyepoxide amine adducts which are chain extended with organic polyols with or without the use of a catalyst, as taught in U.S. Pat. No. 4,148,772 can be used in producing the epoxide polyurethane copolymer on the glass fibers of the present invention. The portions of U.S. Pat. No. 4,148,772 relating to the description of the various chain extended epoxide-amine adducts with the various organic polyols disclosed therein, are incorporated herein by reference. Also as described in U.S. Pat. No. 4,148,772 the epoxide amine adduct which is chain extended can be dispersed or emulsified in water by providing a cationic character for the adduct through reaction with acid to form the tertiary amine acid salt and the portion of U.S. Pat. No. 4,148,772 relating to such description is hereby incorporated by reference. Preferably, the epoxide amine adduct is chain extended with organic polyols for use in the epoxy polyurethane copolymer coating on the glass fibers of the present invention.

The capped or blocked isocyanates which may be employed in providing the epoxy polyurethane copolymer on the glass fibers of the present invention may be any isocyanate where the isocyante groups have been reacted with a compound so that the resultant capped isocyanate is stable to active hydrogens at room temperature but reactive with active hydrogens at elevated temperatures usually between about 90° C. to 200° C. In preparation of the capped organic polyisocyanate, may suitable organic polyisocyanate can be used, but preferably aliphatic polyisocyanates are used, although mixtures of aromatic and aliphatic polyisocyanates can be used. Any suitable aliphatic, cycloaliphatic, aromatic alkyl mono-alcohol and phenolic compounds may be used as capping or blocking agents for the polyisocyanate. The portions of U.S. Pat. No. 4,148,772 relating to descriptions of types of polyisocyanates and capping or blocking agents useful therein is hereby incorporated by reference. Also the description of the reaction between the organic polyisocyanate and capping agent, the description of fully or partially capped isocyanates, the description of the reaction with or without the use of a catalyst and the description of the use of water miscible solvents and reaction conditions and the order of reaction between the polyepoxide, polyol, chain extender, amine and partially capped isocyanates that are described in U.S. Pat. No. 4,148,772, these portions of said Patent are incorporated herein by reference. Preferably, the polyepoxide amine adduct is present in combination with a partially capped polyisocyanate so that the reactive isocyanate groups remain. The partially capped isocyanate can then be reacted with the polyepoxide through active hydrogen functionalities, i.e., hydroxyl, present in the polyepoxide under conditions which will not unblock the isocyanate. This reaction in effect fully cope the isocyanate making it a part of the polymer molecule and a one component system.

The polyepoxide polymer or epoxide amine adduct with isocyanate functionality whether fully blocked or partially blocked has an epoxy polyurethane ratio of about 1:1 to about 3:1. This ratio is that of the weight percent of the epoxy functionality to the weight percent of the crosslinkable isocyanate functionality in the aqueous dispersion or emulsion of the polyepoxide or epoxy amine adduct with isocyanate functionality. The epoxy equivalent weight of the polyepoxide or epoxy-amine adduct can be generally in the range of about 180 to 1,000. The urethane (NHCOO) equivalent weight of the epoxy polyurethane copolymer on the glass fibers of the present invention can be in the range of about 150 to 850, preferably 200 to 350. The equivalent ratio is based on the equivalent of 1,2-epoxy groups and equivalent of active hydrogens which are capable of reacting with 1,2-epoxy groups, e.g., amino, hydroxyl and thiol.

The aqueous dispersion of the above-described resinous products occurs through neutralization or acidification to provide cationic groups, e.g., tertiary amine acid salt groups, or if a ketimine is employed, then neutralized primary amine groups generated by hydrolysis of the ketimine. Neutralization of the products is accomplished by reaction of all or part of the amino groups by water-soluble acid, for example, formic acid, acetic acid, phosphoric acid and the like. The extent of neutralization depends upon the particular resin. It is only necessary that sufficient acid by added to disperse the resin, although it is preferable to add sufficient acid to emulsify the resin along with the presence of one or more emulsifying agents. The term "dispersion" is directed to a two-phase, translucent or opaque aqueous resinous system in which the resin is the dispersed phase and the water is the continuous phase. The average particle size diameter of the resinous phase is generally less than 10 and primarily less than 5 microns. Particles may be spherical or elongated or invisible by microscopic investigation. The term "dispersion" is also intended to cover homogeneous aqueous solutions and emulsions which appear objectly clear. Besides water, the aqueous dispersion may contain a coalescing solvent. The use of coalescing solvents provide in some instances for improved deposited film appearance. Nonexclusive examples of such solvents include hydrocarbons, alcohols, esters, ethers, and ketones.

In addition, the aqueous dispersion or emulsion can have the catalyst composition and, if desired, various additives such as surfactants or wetting agents. The amount of the catalyst employed is that amount which effectively promotes reaction in the deposited film on the glass fibers. For example, amounts varying from about 0.05 percent to about 4 percent by weight based on the total resin solids may be employed. Typically, about 1 percent by weight are employed. However, if curing temperatures after deposition are high enough, catalysts may not be needed. Also if a proper blocking agent for the isocyanate is employed, for example, oximes and phenols, catalysts may be not be needed. Any catalyst known to catalyze the reaction of an isocyanate with alcohols can be used in any medium known to those skilled in the art, For instance, a catalyst paste can be dispersed in the aqueous dispersion or emulsion of the polyepoxide resin or epoxide-amine adduct combined with isocyanate functionality. It is preferred that the polyepoxide or epoxide-amine adduct in combination with isocyanate or polyisocyanate functionality have in the dispersion a catalyst to assist the reaction of the epoxy and isocyanate to form the epoxy polyurethane on the glass fibers of the present invention.

The amount of the aqueous dispersion or emulsion of the polyepoxide resin or epoxide-amine adduct with or without chain extension combined with the isocyanate functionality used in an aqueous chemical treating composition for treating glass fibers can vary. The range of variation can be between about 1 to about 25 weight percent of the aqueous chemical treating composition.

In addition to the aqueous dispersion or emulsion of the polyepoxide resin or epoxide-amine adduct with or without chain extension, combined with isocyanate functionality in the aqueous chemical treating composition for glass fibers, the treating composition also has at least one or more coupling agents. Particularly suitable coupling agents are the organo silane coupling agents and may of the organo silane coupling agents known to those skilled in the art to be useful for treating glass fibers for reinforcing polymeric matrices can be used. Particularly suitable organo silane coupling agents are amino functional organo silane coupling agents, vinyl-functional organo silane coupling agents and epoxy-functional silane coupling agents and mixtures of two or more of these. In addition, another suitable organo coupling agent is that available from Union Carbide under the trade designation Y-5987 which is a silylated polyazamide. The amount of the organo silane coupling agent used in the aqueous chemical treating composition can be any amount known to those skilled in the art for such use. Particularly suitable amounts are in the range of about 0.1 to to about 2 weight percent of the aqueous chemical treating composition for each organo silane coupling agent present in the composition. With the presence of the organo coupling agent, the aqueous chemical treating composition for glass fibers can be complete, although it is preferred to include at least one more component which is a lubricant.

Nonionic and cationic fiber lubricants known to those skilled in the art for use with glass fibers can be used in the aqueous chemical treating composition of the present invention. A particularly suitable fiber lubricant is a polyamino amide type fiber lubricant such as that available from Emery Industries, Inc. under the trade designation 6760 which is a 50% active version of Emery 6717 fiber glass lubricant in a mixture of acetic acid and water. The Emery 6717 fiber glass lubricant is a partially amidated polyalkylene imines such as a reaction product of a mixture of $C_2$ to about $C_{18}$ fatty acids with a polyethylene amine having a molecular weight of about 1200 where the reaction product has a residual amine value of from about 300 to 400 as described in U.S. Pat. No. 3,597,265. Preferably, the fatty acid amidating agent is pelargonic acid. The portions of U.S. Pat. No. 3,597,265 describing the fiber lubricants is incorporated herein by reference. The Emery 6717 lubricant has a viscous liquid pore point of 55 at 25° C., a density in pounds per gallon of 8.3, a cloud point of less than 25° C., a flash point of 540° F. and is soluble to water and dispersible to 5% in mineral oil. Any other glass fiber lubricant known to those skilled in the art to be equivalent to the Emery 6717 lubricant or 6760 lubricant can be used in the present invention. The amount of the lubricant used in the aqueous chemical treating composition of the present invention can be that amount which is known to those skilled in the art for use in aqueous chemical treating compositions applied to glass fibers during their formation. Generally, the amount of the lubricant is in the range of about 0.05 to about 2 weight percent of the aqueous chemical treating composition.

In addition to the polyepoxide polymer or epoxy amine adduct with or without chain extension in combination with the isocyanate functionality present in the aqueous chemical treating composition along with the coupling agent and the lubricant, it is preferred to have present several additional specific film forming polymeric materials. These polymeric film forming materials are aqueous soluble, dispersible or emulsifiable and are always present in a minor amount to the amount of the polyepoxide, epoxide-amine adduct with or without chain extension in combination with the isocyanate functionality.

A suitable combination of polymeric film forming materials includes an epoxidized polyvinyl acetate copolymer along with an ethylene-vinyl acetate copolymer present in the aqueous sizing composition in an amount of about 1:1 to about 1:4 or 4:1. The amount of each of the film forming polymers in the form of an emulsion is generally in the range of about 1 to about 10 weight percent of the aqueous chemical treating composition. The epoxidized polyvinyl acetate copolymer in the form of an emulsion has the copolymer which is a copolymer of glycidyl methacrylate and vinyl acetate. The copolymer contains about two parts of the glycidyl methacrylate per 100 parts of vinyl acetate. Generally, the copolymer has an amount of epoxy functionality in the range of about 3 to about 12 parts per 100 parts of the vinyl acetate. Nonexclusive examples of epoxidized polyvinyl acetate that can be used include aqueous emulsions having various solid concentrations of the epoxidized polyvinyl acetate copolymer with a general particle size within the range of about 0.2 to about 0.3 microns. Commercially available epoxidized polyvinyl acetate aqueous emulsions which may include organic solvents and surfactants include the product designated Resyn 25-1971 available from National Starch, Bridgewater, N.J., which has a 3 percent epoxy functionality or the Resyn 3362-53 also available from National Starch which has a 7 percent epoxy functionality. Another epoxidized polyvinyl acetate copolymer emulsion that has been found useful is that material available from H. B. Fuller under the trade designation "PN-3013". The ethylene vinylacetate copolymer is also present in an emulsion form, usually having around 50 to 55 weight percent solids and can comprise from about 5 to about 40 weight percent ethylene with the remaining amount being vinyl acetate. Suitable examples of ethylene vinyl acetate copolymers are discussed in U.S. Pat. No. 3,716,504 which is hereby incorporated by reference. Particularly useful vinyl acetate ethylene copolymers are available from Airco Chemicals and Plastics Company under the trade designation Aircoflex-X type resins such as the 510 and 400 copolymer products.

Another film forming polymeric material which can be used with the polyepoxide, epoxide amine adduct both having isocyanate functionality is a waater soluble, dispersible or emulsifiable epoxy polymer. A suitable epoxy compound is one that contains more than one group which has an oxygen atom attached to adjacent carbon atoms, known as an oxirane ring so that the epoxy resins are essentially 1,2-poly epoxides. The 1,2-poly epoxides can be prepared by any method known to those skilled in the art to result in aqueous soluble, dispersible or emulsifiable polyepoxide resins. The polyepoxide resin can have an epoxy equivalent weight of 170 to about 900. Typically, the molecular weight range can be between about 300 and about 900 and more preferably about 300 and 600. Epoxy resin or resins can be used in an amount of about 0.1 to about 10 weight percent of the aqueous chemical treating composition and preferably about 0.2 to about 3.5 weight percent based on the total weight of the aqueous chemical treating composition. A particularly suitable epoxy resin for use in the aqueous chemical treating composition to result in treated glass fibers of the present invention is available from Celanese Polymers Specialty Company under the trade designation "Epi-Rez CMD 35201". This epoxy resin is an epoxy resin dispersion which has 59 percent nonvolatiles with the only volatile being water and a weight per epoxide of approximately 530, a pH of 8.3 and an average particle size between 1 and 4 microns. This epoxy resin may be cured using any conventional epoxy curing agent with allowance being made for the water environment. Another suitable epoxy resin that can be used is designated "Genepoxy 370-H55" which is commercially available from General Mills Chemical Division.

In preparing the aqueous chemical treating composition for treating glass fibers, the one or more organo coupling agents that are organo silane coupling agents are prehydrolyzed with a mild acid such as acetic acid. The polyepoxide or epoxide amine adduct with blocked isocyanate functionality or the epoxy polyurethane copolymer is diluted and combined with the prehydrolyzed diluted organo silane coupling agents. The fiber lubricant, if used, is diluted and added to the mixture. The additional dispersions or emulsions of the epoxy vinyl acetate copolymer and ethylene vinyl acetate copolymer or epoxy polymer is added to the mixture. Also an effective amount of defoaming agent to control foaming in the mixture can be added. The mixture is diluted to the final desired volume. Other methods of combining of components can be employed as long as the methods do not result in precipitation or flocculation of the aqueous chemical treating composition. The water that is added to the mixture is preferably deionized water at a temperature of around 65° to 75° F. (18°–24° C.) and themixture is prepared with agitation.

The aqueous chemical treating composition has a solids content in the range of about 1 to about 25 weight percent so that the viscosity of the treating solution is effective for treating glass fibers during their formation. Typically, for the application of an aqueous chemical treating composition to the glass fibers during their formation, the aqueous sizing composition should have a solids content that does not exceed that amount which will cause the viscosity of the solution to be greater than about 100 centipoise at 20° C. Solutions with viscosities of greater than 100 centipoise at 20° C. are very difficult to apply to glass fibers during their formation without breaking the fibers. Although it is possible to include in the chemical treating composition a viscosity modifying agent or thickener to apply the chemical treating composition as a thixotropic composition with the utilization of proper equipment for applying such a chemical composition to the glass fibers during their formation.

The aforementioned aqueous chemical treating compositions are complete for treating glass fibers during the their formation. It is not necessary to add any other components to the aqueous chemical treating composition, although additional components can be added without detrimentally affecting the performance of the basic aqueous chemical treating compositions. Such additional components could include processing aids, wetting agents, and the like. The cationic nature of the aqueous chemical treating composition should be controlled to avoid any kick-out of the components of the aqueous chemical treating composition.

The aqueous chemical treating composition is applied to glass fibers of any fiberizable glass composition known to those skilled in the art. Nonexclusive examples include "E-glass", "621-glass", "A-glass", "C-glass", "S-glass", and lower free fluorine and/or boron derivatives thereof. The method of applying aqueous chemical treating composition to the glass fibers can be any method known to those skilled in the art. Generally, the aqueous chemical treating composition is applied to the glass fibers during their formation before they are gathered into a bundle of fibers, strands. Myriad examples of such an application process are illustrated in U.S. Pat. No. 4,271,229 which is hereby incorporated by reference. The aqueous chemical treating composition is applied to the fibers to obtain a solids application of the chemical treating composition on the fibers of generally about 0.1 to around 5 percent by weight. Although greater amounts of solids application could be used, additional benefits may not result to justify the additional cost. The solids application is based on the total weight of the fibers with the chemical treatment and is measured by a loss on ignition test known in the art as an LOI test. Once the aqueous chemical treating composition is applied to the glass fibers, for example, by means to enable a liquid to contact the solid fibers such as a roller applicator, spray applicator, belt applicator or the like, the fibers are gathered into strands and collected as continuous or chopped glass fiber strands. Attenuation is provided by a winder in the collection of continuous glass fiber strands and by pull rollers above chopping apparatus for the production of chopped glass fiber strands. The glass fibers can be formed by any method known to those skilled in the art such a mechanical attenuation, flame blowing and the like.

The continuous or chopped glass fiber strands are dried to effect crosslinking of the isocyanate moieties and formation of the epoxy polyurethane on the glass fibers. The drying can occur at ambient temperatures or at elevated temperatures in conventional drying ovens at temperatures of around 90° C. to 200° C., but preferably the temperature is less than 150° C. and most preferably around 115° to 130° C. for around 11 hours. Any time and temperature relationship can be employed that gives equivalent drying to remove a substantial amount of the moisture from the strands and to effect the deblocking of the isocyanate and crosslinking of the isocyanate with the active hydrogens of the polyepoxide film former. Any drying technique known to those skilled in the art can be employed to dry the glass fibers. For instance, dielectric, air, radio frequency or vacuum drying can be employed.

Also the aqueous chemical treating composition can be applied to already sized glass fibers as a secondary coating. Such a coating would be applied in a manner known to those skilled in the art for applying secondary coatings like tire cord dip. The first coating or sizing composition can be any conventional sizing composition known to those skilled in the art of utilizing sized glass fibers for reinforcing polymers.

The dried strands of chemically treated glass fibers usually have a clear appearance and portions of the surfaces of the glass fibers are covered with a coating which is or approaches a continuous film. The dried continuous glass fiber strands can be chopped or processed into roving for reinforcement of polymers and the dried chopped glass fiber strands can be used directly for reinforcing polymeric matrices.

In using the dry chopped glass fiber stands or the wet chopped glass fiber strands, the length of the chopped strands can be any length know to those skilled in the art, but preferably the length is around ⅛ inch to less than 2 inches is used, although shorter and/or longer lengths can be used. The chopped glass fiber strands can be used in sheet molding compound, bulk molding compound, high glass content molding compound, thick molding compound, injection molding, compression molding and like molding techniques for reinforcing polar thermoset and thermoplastic polymeric matrices. Nonexclusive examples of polymeric matrices include: unsaturated polyester polymers, saturated polyester polymers, polyethylene terephthalate, polybutylene terephthalate, polyphenylene oxide, polyamides, unsaturated epoxies, vinyl esters, phenolics and other thermosetting polymers. Also the strands of the chemically treated fibers can be used in the form of a chopped strand mat or a continuous strand mat for reinforcing polymeric materials. The process of forming the various polar thermosettting and thermoplastic polymeric matrices reinforced with the strands of chemically treated glass fibers of the present invention can be any method known to those skilled in the art utilizing, for example, the aforementioned molding techniques. The resultant reinforced polymeric matrices have good strength properties in at least one strength area such as tensile strength, flex modulus, flexural strength and impact strength.

PREFERRED EMBODIMENT

The glass fibers of the preferred embodiment are of the "621-glass" type and are treated with the aqueous chemical treating composition having a polyepoxide-amine adduct which is chain extended with partially blocked crosslinkable isocyanate functionality. The isocyanate functionality is preferably an aliphatic polyisocyanate. The aqueous chemical treating composition also has two organo silane coupling agents, one of which is a vinyl-containing organo silane coupling agent and an amino-silane coupling agent. In an alternative embodiment, an epoxy-containing organo silane coupling agent agent can also be used. Also present is a small amount of cationic lubricant which is a polyamino polyamide lubricant. Also present in a minor amount to the polyepoxide-amine isocyanate containing polymeric matrial are the epoxy polyvinyl acetate copolymer and ethylene vinyl acetate copolymer. Preferably the epoxy to urethane ratio in the aqueous chemical treating composition is around 2 to 1. Also in the preferred embodiment, the aqueous dispersion of the polyepoxide amine adduct with blocked polyisocyanate functionality utilizes a catalyst paste to catalyze the isocyanate crosslinking reaction in curing the polyepoxide polyurethane copolymer at lower drying temperatures of the treated glass fibers.

The aqueous dispersion of the polyepoxide-amine adduct with blocked isocyanate functionality is preferably prepared from the following mixture of materials.

| Material | Pounds (kg) | Pounds (kg) | % of Solids |
|---|---|---|---|
| Epon 828[1] | 95.2 (43.2) | 91.8 (41.6) | 42.4 |
| PCP-0200 poly-oxyalkylene[2] | 36 (16.3) | 36 (16.3) | 12.5 |
| Bisphenol A | 26.8 (12.1) | 26.8 (12.1) | — |
| Benzyl dimethyl amine | 0.5 (.23) | | |
| Capped isocyanate crosslinker[3] | 121.3 (55) | 84.9 (38.5) | 29.7 |
| Diketamine derived from diethylene triamine and methyl-isobutyl ketone (72% solids in methyl isobutyl ketone) | 10.4 (4.7) | 7.6 (3.4) | 2.6 |
| N—methyl ethanol-amine | 8 (3.6) | 8 (3.6) | 2.8 |
| Polytetra-methylene glycol (Polymeg 650 plasticizer) | 26 (11.8) | | 9 |
| Xylene | 35 (15.9) | — | — |
| Acetic acid | 4.4 (2) | — | — |
| Cationic surfactant[4] | 7 (3.2) | — | 1 |
| Deionized water | 534.5 (242) | — | — |

[1]The epoxy resin solution was made from reacting epichlorohydrin and bisphenol A having an epoxy equivalent of around 188 and commercially available from Shell Chemical Company.
[2]The PCP 0200 or "Tone 200" available from Union Carbide Corporation is the reaction product of diethylene glycol and Epsilon-caprolactone to produce a polyester diol.
[3]The polyurethane crosslinker is formed from half-capping an aliphatic diisocyanate such as Hylene W or Desmodore W -continued methylene-bis-(4-cyclohexyl) isocyanate with 2-butoxy ethanol and
reacting this product with trimethylol propane in a 3-molar ratio.
The crosslinker is present as a 70 percent solution in a 90/10
mixture of the methyl isobutyl ketone and n-butanol.
In an alternative method, the polyurethane crosslinker can be
prepared with the 2-ethyl hexanol with the diisocyanate in an agitated
closed vessel under a dry nitrogen blanket with external cooling to keep
the reaction mixture temperature at 100° C. The batch is held an
additional ½ hour after all of the 2-ethyl hexanol was added and then
heated to 140° C. at which point the trimethylol propane is added
followed by the addition of a catalytic amount of dibutyl tin
dilaurate catalyst. After an additional exotherm, the bath was held
at 250° C. for 1½ until essentially all of the isocyanate was
consumed as indicated by an infrared scan. The batch is then thinned
with the 2-ethoxy ethanol.
[4]The cationic surfactant is prepared by blending 120 parts
of an alkyl imidazoline commercially available from Geigy Industrial
Chemicals as GEIGY AMINE C, 120 parts by weight of an acetylenic
alcohol commercially available from Air Products and Chemicals,
Inc. as 104, 120 parts by weight of 2 butoxy ethanol and 221
parts by weight of a deionized water and 19 parts by weight of
glacial acetic acid.
The Epon 828, PCP 0200 and xylene are charged to a reaction vessel
and heated with a nitrogen sparge to 210° C. The reaction is held
at reflex for about ½ hour to remove water. The reaction mixture
is cooled to around 150° C. and the bisphenol A and about 42 percent
of the benzyl dimethyl amine catalyst is added. The reaction mixture
is heated to 150 to 190° C. and held at this temperature for about
1½ hours and then cooloed to 130° C. The remaining portion of the
benzyl dimethyl amine catalyst is added in the reaction mixture held at
around 130° C. for around 2½ hours until a reduced
Gardener-Holdt viscosity (50 percent resin solids solution in 2-ethoxy
ethanol) of P is obtained.
The polyurethane crosslinker and diketimine derivative and the
N—methlethanolamine are added and the temperature of the reaction
mixture brought to around 110° C. and held at this temperature for
around 1 hour.
The 2-ethoxyethanol is prepared and the reaction mixture is
dispersed in water by adding the reaction mixture to a mixture of the
acetic acid, deionized water and the cationic surfactant mixture. This
dispersion is diluted to about 32 percent solids with deionized water and
vacuum stripped to remove organic solvent to give a dispersion having
a solids content of 36 percent.
A catalyst paste is prepared with dibutyl tin oxide being
dispersed in a grinding vehicle in the following amounts.

| Grinding Vehicle[5] | Parts by Weight 145 |
|---|---|
| Deionized Water | 321.6 |
| Dibutyl tin oxide | 200 |

[5]The grinding vehicle is prepared from the following
charge.

|  | Parts by Weight | Solids |
|---|---|---|
| Epon 829 epoxy resin | 710 | 682 |
| Bisphenol A | 289.6 | 289.6 |
| 2 ethyl hexanol mono urethane of 2,4-toluene diisocyanate and methyl isobutyl ketone | 406.4 | 386.1 |
| Quaternizing agent[6] | 421.9 | 421.9 |
| Deionized water | 71.2 |  |
| 2 butoxy ethanol | 1490 |  |

[6]The quaternizing agent is prepared from the following
charge.

| Ingredients | Parts by Weight | Solids |
|---|---|---|
| 2 ethyl hexanol half-capped toluene di isocyanate in methyl isobutyl ketone | 320 | 304 |
| Dimethyl ethanolamine | 87.2 | 87.2 |
| Aqueous lactic acid solution | 117.6 | 88.2 |
| 2 butoxy ethanol | 39.2 |  |

The 2-ethyl hexanol half-capped toluene diisocyanate was added to the dimethyl ethanolamine in a suitable reaction vessel at room temperature. The mixture exothermed and was stirred for 1 hour at 80° C. Lactic acid was then charged followed by addition of 2-butoxy ethanol. The reaction mixture was stirred for about 1 hour at 65° C. to form the desired quaternizing agent. The pigment vehicle was prepared by charging the Epon 829 and bisphenol A under a nitrogen atmosphere to a suitable reaction vessel and heated to 150° to 160° C. The reaction mixture was then cooled to 120° C. and the 2-ethyl hexanol half-capped toluene diisocyanate was added. The temperature of the reaction mixture was held at 110° to 120° C. for 1 hour followed by the addition of the 2 butoxy ethanol. The reaction mixture was then cooled to 85° to 90° C., homogenized and then charged with water followed by the addition of the quaternizing agent. The temperature of the reaction mixture was held at 80° to 85° C. until an acid value of about 1 was obtained. Further reaction mixture had a solids content of 55 percent. In preparing the catalyst paste, the ingredients of the grinding vehicle and the deionized water and the dibutyl tin oxide were mixed together and ground to a Hegman No. 7 grind. This material was added to the aqueous dispersion of the epoxy polyurethane material.

The aqueous dispersion of the epoxy polyurethane is diluted with warm deionized water (65° to 75° F. (18°-24° C.)) with stirring at a rate not to induce air. The dilution is to around 30 weight percent solids.

The final-organo silane coupling agent is preferably gamma methacryloxypropyltrimethoxy silane (A-174 available from Union Carbide) and the amino organo silane is preferably gamma-aminopropyltriethoxy silane (A-1100 available from Union Carbide) and in an alternative embodiment, the epoxy-organo silane is also used, which is preferably gamma-glycidoxy propyltrimethoxy silane (A-187 available from Union Carbide). The organo silanes are hydrolyzed with deionized water and acetic acid necessary to adjust the pH between 3.5 and 4 with agitation as not to induce air. The hydrolyzed organo silanes are added with the diluted dispersion of the polyepoxide-amine adduct with blocked polyisocyanate functionality to a mixing vessel. In hydrolyzing the A-1100, the acetic acid is added to adjust the pH to a value of 7±0.2 and with the epoxy organo silane, the pH is adjusted to 4.5 to 5. The hydrolyzed vinyl organo silane and hydrolyzed amino organo silane are combined with the aqueous emulsion of the epoxy amine adduct with capped polyisocyanate functionality in a mixing vessel. The cationic lubricant which is preferably the Emery 6760 polyamino polyamide lubricant is diluted with deionized water at a temperature of 120° to 140° F. with agitation so not to induce air and added to the mixture. To the hydrolyzed epoxy organo silane, there is added the epoxy polyvinyl acetate with agitation over a period of about 10 minutes. This mixture is then added to the first mixture at a rate of about 5 gallons per minute. The ethylene vinyl acetate copolymer emulsion is then added to the first mixture at a rate of about 5 gallons per minute. The aqueous chemical treating composition is diluted to a final volume with warm deionized water with agitation.

The aqueous chemical treating composition is applied to glass fibers having a filament diameter ranging from less than 5 microns to greater than 30 microns but preferably around 10 to 15 microns in diameter. Any number of the treated glass fibers can be gathered into one or more strands and wound onto a mandrel to produce a continuous glass fiber strand package called a forming package. A number of forming packages are then dried in a hot air drying oven at a temperature of around 100° to 150° C. The aqueous chemical treating composition was added to the glass fibers during their formation at such a rate of forming the glass fibers and applying the aqueous chemical treating composition to result in strands having a dried residue of around 0.1 to 3 weight percent of the aqueous chemical treating composition. The dried cured strands of treated glass fibers are preferably prepared into a roving which is a multistrand package of strands of glass fibers and dry chopped for use in reinforcing polar thermosetting polymers such as unsaturated polyesters, epoxies, vinyl esters and thermoplastics such as polyphenylene oxide.

EXAMPLES

Four polyepoxide-amine adducts with partially capped polyisocyanate functionality were prepared in accordance with the method and with the same components as the preferred embodiment. Example 1 is the preferred embodiment and Examples 2-4 vary in the epoxy/urethane ratio, total solids percent, solvent and pH of the aqueous dispersion of the polyepoxide-amine adduct with chain extension and partially capped polyisocyanate functionality. The four samples are as follows:

TABLE 1

| Properties | Example 1 | Example 2 | Example 3 | Example 4 |
|---|---|---|---|---|
| Total solids (percent nonvolatiles) | 36 | 34.4 | 34.6 | 34.2 |
| Epoxy percent of total solids | 42.38 | 47.6 | 47.6 | 47.6 |
| Cross-linkable aliphatic polyurethane percent of total solids | 29.73 | 33 | 20 | 40 |
| Epoxy as 1:3 polyester/epoxy copolymer:urethane ratio | 1.43:1 | 1.44:1 | 2.38:1 | 1.19:1 |
| Solvent percent | 64 | 19.4 | 32.4 | 12.4 |
| pH | | 6.95 | 7.05 | 6.8 |

The aqueous dispersions of the polyepoxide-amine adduct which is chain extended and has partially capped polyisocyanate functionality having the catalyst paste for Examples 1-4 were used in preparing various aqueous chemical treating compositions.

In Table 2, there are depicted two aqueous chemical treating compositions utilizing the aqueous dispersion of Example 1.

The aqueous chemical treating composition of Example I of Table 2 was prepared in the following manner. The vinyl organo silane coupling agent was hydrolyzed by adding the required amount of deionized water (65° to 75° F.) (18°-24° C.) to a premix tank. The acetic acid necessary to adjust the pH value between 3.5 and 4 was added and the materials mixed for 5 minutes at a rate that did not induce air. The clear mixture of the hydrolyzed vinyl organo silane coupling agent was transferred to a main mix tank. The aqueous dispersion of the polyepoxide-amine adduct which is chain extended and has partially blocked polyisocyanate functionality was diluted with warm deionized water to about 30 weight percent solids in a premix tank with agitation so as not to induce air for around 5 minutes and transferred to the main mix tank at a slow rate. The amino organo silane coupling agent was hydrolyzed with deionized water at 65° to 75° F. (18°-24° C.) and enough acetic acid to adjust the pH to around 7±0.2 with agitation for a short period of time at a rate not to induce air. The hydrolyzed amino silane solution was transferred to the main mix tank at a slow rate. The polyamino polyamide lubricant was diluted with warm deionized water (120° to 140° F.) (49°-60° C.) in a premix tank with agitation at a rate not to induce air for around 10 minutes and transferred to the main mix tank. The stated amount of the epoxy polyvinyl acetate copolymer dispersion (Resyn NS-1971) was added to the main mix tank at a slow rate. The stated amount of the ethylene vinylacetate copolymer dispersion was added to the main mix tank at a slow rate. A small amount of Sag 470 antifoaming agent was added to the main mix tank and the mixture was diluted to the final volume with warm deionized water.

For the aqueous chemical treating composition of Example II of Table 2 the procedure of preparing the composition differed from the procedure of preparing the composition of Example I in that an epoxy organo silane coupling agent was used. The epoxy organo silane coupling agent was prehydrolyzed and combined with the epoxy polyvinyl acetate copolymer dispersion and added to the main mix tank as described in the preferred embodiment.

TABLE 2

| Sizing Components | I 1579 kg/378.541 | II 1777 kg/378.541 |
|---|---|---|
| Gamma-methacryloxypropyltrimethoxysilane (A-174) | 0.67 | 2 |
| Acetic acid | AS PER pH VALUE | |
| Water | 56.7 | 40 |
| Aqueous dispersion of chain extended polyepoxide with crosslinkable polyisocyanate of Example 1 | 166.7 | 166.7 |
| Other Example | | |
| Water | 56.7 | 37.8 |
| Gamma aminopropyltriethoxy silane (A-1100) | 0.67 | 0.67 |
| Acetic acid (hydrolyzed) | | |
| Water | 30.4 | 12.2 |
| Polyaminoamide lubricant Emery 6760 | 0.5 | 0.5 |
| Water | 7.7 | 9.1 |
| Gamma-glycidoxypropyltrimethoxy silane (A-187) | — | 2 |
| Water | — | 45.4 |
| Aqueous dispersion epoxy polyvinylacetate copolymer (Resyn NS-1971) % solids | 10 | 10 |
| Aqueous dispersion of ethylene vinyl acetate copolymer Airflex 510 | 10.3 | 10 |
| Antifoaming agent SAG 470 | 0.4 | 0.4 |
| Epoxy polymer CMD 35201 from Celanese 60% solids | — | — |
| Water | — | — |
| Organosilane Y-5987 (100% solids) | — | — |
| Water | — | — |
| Water | TO FINAL VOLUME | |
| Solids | 19.5 | 19.5 |
| pH | 6 | 6 |

The aqueous chemical treating compositions of III-VI of Table 3 were prepared in a similar manner to the aqueous chemical treating compositions of Examples I and II for the components of the vinyl organo silane coupling agent, the aqueous dispersion of chain extended polyepoxide with crosslinkable polyisocyanate and polyamino amide lubricant. The addition of the aqueous dispersion of epoxy polymer was after a predilution with the recited quantity of water. The silylated polyazamide was added as the 100 percent solids containing liquid. The aqueous chemical treating compositions of Examples IV-VI are the preferred aqueous treating compositions for producing treated glass fibers for reinforcing thermoplastic polymers. Nonexclusive examples of which are polybutylene terephthalate, polyphenylene oxide, polyphenylene sulfide and the like.

of chemically treated glass fibers having a construction of K 37/2s. These continuous glass fiber strands were used in preparing reinforced polymeric materials. Various reinforced polymeric materials were used and vari-

TABLE 3

| Sizing Components | III kgm/37.8 | IV gms/5 Gal | V gm/5 Gal | VII gm/5 Gal |
|---|---|---|---|---|
| Gamma-methacryloxypropyl-trimethoxysilane (A-174) | — | — | — | — |
| Acetic acid | | AS PER pH VALUE | | |
| Water | — | — | — | — |
| Aqueous dispersion of chain extended polyepoxide with crosslinkable polyisocyanate of Example 1 | 11255 ml | — | — | — |
| Other Examples of poly-epoxide-amine adduct with isocyanate functionality from Table 1 (Eg. number)/amount | 5.6 kg | (Eg 2)/ 5.6 kg | (Eg 3)/ 5.5 kg | (Eg 4)/ 5.5 kg |
| Water | 22710 ml | 11120 ml | 11040 ml | 11180 ml |
| Polyaminoamide lubricant Emery 6760 | 0.5 | — | — | — |
| Epoxy polymer CMD 35201 from Celanese 60% solids | — | 318 (.32 kg) | 318 | 318 |
| Water for prediluting epoxy | — | 318 | 318 | 318 |
| Organosilane Y-5987 (100% solids) | — | 191 | 191 | 191 |
| Water | — | 3785 | 3785 | 3785 |
| Water | | TO FINAL VOLUME | | |
| Solids | 10 | 11.7 | 11.7 | 11.7 |
| pH | 6 | 5.25 | 5.25 | 5.25 |

In addition, a dip coating method was used with strands of glass fibers that were sized with the aqueous chemical treating composition of U.S. Pat. No. 4,390,647, hereby incorporated by reference. This sizing composition had the following formulation:

| | |
|---|---|
| Deionized water | 24700 grams |
| Polyoxyalkylene polyol | 300 grams |
| Polyalkylene polyol | 300 grams |
| Cationic lubricant | 200 grams |
| Gamma mercaptopropyl trimethoxy-silane (A-189) | 200 grams |

These strands of glass fibers were treated in a dip coating process of a conventional tire cord dip operation. The dip coatings were the aqueous chemical treating compositions of Examples VII and VIII of Table 4.

TABLE 4

| Sizing Components | VII Wt % Solids | VIII Wt % Solids |
|---|---|---|
| Gamma-methacryloxypropyl-trimethoxysilane (A-174) | 1 | — |
| Aqueous dispersion of chain extended polyepoxide with crosslinkable polyisocyanate of Example 1 | 99 | 99 |
| Gamma aminopropyltriethoxy silane (A-1100) | 1 | 1 |
| Solids content | 18 | 18 |

The aqueous chemical treating compositions of I-VIII were used in treating glass fibers having a filament diameter of 10 microns and prepared into strands ous molding techniques were used. The types of matrix polymer systems used and the glass fibers having the dried residue of the aqueous chemical treating compositions of Tables 2–3 or dip coatings of Table 4 are listed in Table 5 along with and the strength properties of the fiber reinforced polymer. The measurement of the strength properties of the fiber reinforced polymer included tensile strength, flexural strength, flex modulus, izod impact, wet-out and Gardener index for a few of the fiber reinforced polymer samples. Controls for the fiber reinforced polymers are also limited in Table 5. The controls are listed just above the samples. The test for tensile strength, flexural strength, flexural modulus and izod impact strengths were conducted in accordance with standard test methods of the American Society of Testing and Materials (ASTM). These tests included respectively D-638, D-790, D-790 and D-56. Results of Table 5 indicate that the strength properties of polymeric materials reinforced with the treated glass fibers of the present invention increase the strength in at least one area while giving equivalent strengths to the controls for other strength areas. The controls were commercially available strands of glass fibers which are known to be utilized for reinforcing the specific polymeric material tested. In Table 5 the glass fiber reinforced thermoplastic polymer, polyphenylene oxide (PPO) reinforced with glass fiber strand treated with the aqueous treating compositions of Table 3 gave good results. The control for the PPO was commercially available glass fiber strand for reinforcing thermoplastic polymers.

TABLE 5

| | | Performance Properties of Glass Fiber Reinforced Polymers | | | | | | |
|---|---|---|---|---|---|---|---|---|
| Reinforced Polymer w/ sized glass fibers fibers of Eg from Tab 1 | Matrix Resin System | % Glass Fiber Strand | DPU | Tensile Strength psi/ | Flex Strength psi/ | Flex Modulus $\times 10^6$ - psi/ | Izod Impact | Wet-out |
| Control SMC Polyester | | — | — | 11,110 | 26,400 | 1.87 | 12.5 | 100% |
| Control Derakane | | — | — | 23,500 | 46,400 | 2.46 | 20.9 | 85% |

TABLE 5-continued

Performance Properties of Glass Fiber Reinforced Polymers

| Reinforced Polymer w/ sized glass fibers fibers of Eg from Tab 1 | Matrix Resin System | % Glass Fiber Strand | DPU | Tensile Strength psi/ | | Flex Strength psi/ | | Flex Modulus × 10⁶ - psi/ | | Izod Impact | | Wet-out |
|---|---|---|---|---|---|---|---|---|---|---|---|---|
| 790 vinyl ester | | | | | | | | | | | | |
| I | SMC Polyester | — | — | 11,400 | | 33,200 | | 1.89 | | 17.2 | | 100% |
| II | Derakane 790 vinyl ester | — | — | 20,500 | | 44,500 | | 2.86 | | 19.9 | | 90% |
| I | SMC Polyester | — | — | 10,600 | | 27,400 | | 1.97 | | 13.6 | | 100% |
| II | Derakane 790 vinyl ester | — | — | 20,500 | | 43,500 | | 2.57 | | 23.4 | | 90% |
| Control Inj. Mold A | | 25.2 | — | 3,110 | | 7,750 | | 1.11 | | 2.76 | | |
| Control Inj. Mold B | ¼" | 30 | — | 3,520 | | 4,410 | | — | | 2.35 | | |
| VII₁ | Inj. Mold A | 24.5 | 5 | 4,500 | | 10,400 | | 1.2 | | 2.08 | | |
| VII₂ | Inj. Mold B | 30 | 5 | 4,620 | | 7,560 | | — | | 2.17 | | |
| VIII₁ | Inj. Mold A | 24.5 | 10 | 3,940 | | 9,070 | | 1.11 | | 2.54 | | |
| VIII₂ | Inj. Mold B | 30 | 10 | 3,930 | | 6,480 | | — | | 2.41 | | |
| Control A (MPa) (GPa) (J/M) | SMC Polyester | 28.6 | — | 12,100 | (83.4) | 30,200 | (208) | 1.73 | (11.9) | 13.5 | (721) | |
| Control B | Hifill SMC Polyester | 27.9 | — | 9,830 | (67.8) | 23,500 | (162) | 1.74 | (11.9) | 13.8 | (737) | |
| III, LOI 1.73 & 1.85 | | | | | | | | | | | | |
| III₁ | SMC Polyester | 27 | — | 9,850 | (67.9) | 24,800 | (17.1) | 1.64 | (11.3) | 14.6 | (779) | |
| III₂ | Hifill SMC Polyester | 28.4 | — | 8,630 | (59.5) | 25,200 | (174) | 1.89 | (13) | 13.4 | (715) | |
| Control for IV, VI ⅛" | PPO | 20 | — | 11,900 | | 14,800 | | 0.8 | | 1.52 | | |
| IV ⅛" | PPO | 20 | — | 12,700 | | 16,500 | | 0.8 | | 1.91 | | |
| V ⅛" | PPO | 20 | — | 12,700 | | 16,400 | | 0.8 | | 2.07 | | |
| VI ⅛" | PPO | 20 | — | 12,600 | | 16,700 | | 0.8 | | 2.09 | | |

We claim:

1. Glass fibers treated with an aqueous chemical treating composition for reinforcing polymeric matrices, comprising:
   a. an aqueous dispersion of an epoxy polyurethane copolymer essentially free of any quaternary ammonium salts and having epoxy groups and having crosslinkable groups selected from isocyanate, polyisocyanate, and polyurethane moieties present as the sole compatibilizing polymeric material,
   b. one or more organo silane coupling agents,
   c. water in an effective amount to provide for treatment of the glass fibers to yield about 0.1 to about 5 weight percent solids of the treating composition on the glass fibers.

2. Glass fibers of claim 1, wherein the aqueous chemical treating composition further comprises one or more cationic or nonionic fiber lubricants.

3. Glass fibers of claim 1, wherein the aqueous chemical treating composition is a dried residue in an effective amount of around 0.1 to about 5 weight percent solids of the treated glass fibers from drying the treated glass fibers at temperatures ranging from ambient to elevated to cure the epoxy polyurethane copolymer to be insoluble in solvents that dissolve the uncured epoxy polyurethane copolymer.

4. Glass fibers of claim 1, wherein the epoxy polyurethane copolymer is chain extended with organic polyols having active hydrogens.

5. Glass fibers of claim 1, wherein the organo coupling agent is selected from the group consisting of vinyl organo silane, amino organo silane, epoxy organo silane or mixtures of two or more in an amount up to around 30 weight percent of the solids of the aqueous chemical treating composition or up to around 10 weight percent of the aqueous chemical treating composition.

6. Glass fibers of claim 1, wherein the epoxy polyurethane is present in the aqueous chemical treating composition in an amount up to around 25 weight percent of the aqueous chemical treating composition.

7. Glass fibers of claim 1, wherein the lubricant is a polyamino amide lubricant present in an amount in the range of about 0.05 to about 5 weight percent of the aqueous chemical treating composition.

8. Glass fibers of claim 1, wherein the epoxy polyurethane has a ratio of epoxy functionality to crosslinkable polyurethane functionality as a percentage of the total solids of from around 1:1 to around 3:1.

9. Glass fibers of claim 1, wherein the crosslinkable polyurethane is aliphatic.

10. Glass fibers of claim 1, having thereon a dried residue of a forming size and overcoated with said aqueous chemical treating composition is added as a dip coating.

11. Glass fibers of claim 10, wherein the organo silane coupling agent is a silylated polyazamide.

12. Glass fibers of claim 1, wherein the aqueous dispersion of epoxy polyurethane copolymer in the aqueous chemical treating composition is prepared by reacting the copolymer with a primary or secondary amine to form an epoxide-amine adduct where the adduct is solubilized by reaction with acid to form a tertiary amine acid salt group.

13. Glass fibers of claim 1, wherein the epoxy polyurethane copolymer has two or more epoxy groups per molecule and is prepared by combining polyepoxide having a molecular weight of at least 350 to 5,000 with partially blocked, crosslinkable isocyanate derivative capable of reacting with the polyepoxide having active hydrogens selected from the group consisting of hydroxyl, primary amino hydrogen functionalities and mixtures thereof so that the blocked isocyanate derivatives function as crosslinking or curing agents for the polyepoxide when the glass fibers having the aqueous chemical treating composition are heated to unblock the blocked polyurethane 14. Glass fibers of claim 13, wherein upon application of heat at a temperature of about 90° C. to 200° C. the blocked isocyanate moieties of the copolymer become reactive with active hydrogens and provide crosslinks or curing of the copolymer on the glass fibers.

15. Glass fibers of claim 13, wherein the isocyanate is an aliphatic isocyanate present in the copolymer to give a urethane equivalent weight of the copolymer in the range of about 150 to 850 and the polyepoxide is the polyepoxide amine adduct having an epoxy equivalent weight of about 180 to 1,000.

16. Glass fibers of claim 1, wherein the aqueous chemical composition additionally has present a catalyst to promote reaction of the aqueous chemical composition in a deposited film of the glass fibers in an amount in the range of 0.05 to 4 weight percent of the total resin solids.

17. Glass fibers treated with an aqueous chemical treating composition, comprising:
   a. an aqueous dispersion of an epoxy polyurethane copolymer essentially free of any quaternary ammonium salts present as a compatibilizing polymeric material where the polyurethane is crosslinkable,
   b. polyvinyl acetate copolyner and an ethylene vinyl acetate copolymer which are water soluble, dispersible or emulsifiable and both are present in a minor amount to the amount of the epoxy polyurethane,
   c. one or more organo silane coupling agents,
   d. water in an effective amount to provide for treatment of the glass fibers.

18. Glass fibers treated with an aqueous chemical treating composition, comprising:
   a. an aqueous dispersion of an epoxy polyurethane copolymer essentially free of any quaternary ammonium salts present as a compatibilizing polymeric material where the polyurethane is crosslinkable,
   b. an aqueous soluble or emulsifiable epoxy polymer,
   c. one or more organo silane coupling agents, and
   d. water in an effective amount to provide for treatment of the glass fibers.

* * * * *

UNITED STATES PATENT AND TRADEMARK OFFICE
CERTIFICATE OF CORRECTION

PATENT NO. : 4,745,028

DATED : May 17, 1988

INVENTOR(S) : Balbhadra Das et al

It is certified that error appears in the above-identified patent and that said Letters Patent is hereby corrected as shown below:

Column 18, lines 43-44, "is added as a dip coating" should be deleted.

Signed and Sealed this

Twenty-fifth Day of October, 1988

Attest:

DONALD J. QUIGG

Attesting Officer

Commissioner of Patents and Trademarks